(12) United States Patent
Nagasaka et al.

(10) Patent No.: US 7,063,467 B2
(45) Date of Patent: Jun. 20, 2006

(54) OPTICAL MODULE AND METHOD OF MANUFACTURING THE SAME, AND HYBRID INTEGRATED CIRCUIT, HYBRID CIRCUIT BOARD, ELECTRONIC APPARATUS, OPTO-ELECTRICITY MIXED DEVICE, AND METHOD OF MANUFACTURING THE SAME

(75) Inventors: Kimio Nagasaka, Nirasaki (JP); Akira Miyamae, Fujimi-machi (JP); Takeo Kaneko, Misato-Mura (JP)

(73) Assignee: Seiko Epson Corporation, Tokyo (JP)

( * ) Notice: Subject to any disclaimer, the term of this patent is extended or adjusted under 35 U.S.C. 154(b) by 182 days.

(21) Appl. No.: 10/761,210

(22) Filed: Jan. 22, 2004

(65) Prior Publication Data

US 2004/0234210 A1  Nov. 25, 2004

(30) Foreign Application Priority Data

Feb. 6, 2003  (JP) ............................. 2003-030084

(51) Int. Cl.
*G02B 6/36* (2006.01)

(52) U.S. Cl. ........................... 385/88; 385/89; 385/90; 385/91; 385/92; 385/93; 385/94

(58) Field of Classification Search .................. 385/80, 385/88–94
See application file for complete search history.

(56) References Cited

U.S. PATENT DOCUMENTS 6,910,812 B1 * 6/2005 Pommer et al. ............... 385/92

FOREIGN PATENT DOCUMENTS

JP          A 7-49437          2/1995

* cited by examiner

*Primary Examiner*—Brian Healy
*Assistant Examiner*—Jerry Martin Blevins
(74) *Attorney, Agent, or Firm*—Oliff & Berridge, PLC

(57) ABSTRACT

An optical module may include precise guide pins formed in a transparent substrate or an optical transmission line support member. The precise guide pins may be inserted into corresponding precise guide holes within the transparent substrate or the optical transmission line support member to precisely align optical elements. The precise guide holes may be formed within one of the transparent substrate and the optical transmission line support member by positioning protruding portions of a jig within over-sized guide holes and filling a gap between the protruding portions of the jig and the respective over-sized guide holes with a filler material. Once the filler material is cured, the jig may be withdrawn leaving precisely positioned guide holes.

25 Claims, 9 Drawing Sheets

UV irradiated

OPTICAL MODULE AND METHOD OF MANUFACTURING THE SAME, AND HYBRID INTEGRATED CIRCUIT, HYBRID CIRCUIT BOARD, ELECTRONIC APPARATUS, OPTO-ELECTRICITY MIXED DEVICE, AND METHOD OF MANUFACTURING THE SAME

BACKGROUND OF THE INVENTION

1. Field of Invention

The present invention relates to apparatus, components and the like, which carry out information communication (signal transmission) between a plurality of apparatus or within an apparatus and the like, by using an optical signal.

2. Description of Related Art

Acceleration of a signal transfer rate between circuit chips or between circuit boards and the like included in various apparatus has advanced, and thus problems of cross talk between signal lines, noise radiation, impedance mismatching, high power consumption and the like are becoming critical. For this reason, optical communication is beginning to be introduced even for signal transmission inside an apparatus. Furthermore, a method of transmitting an optical signal through an optical fiber (tape fiber) or an optical waveguide, instead of other methods of running electric signal in metal wiring, between circuit chips and between modules and the like inside an apparatus, is being employed.

When carrying out optical communication, it is important to precisely align the mutual positioning (optical-axis alignment) at nodes, which exist on a transmission path of the optical signal, for example, between optical fibers, and between an optical fiber and a light-emitting element or a photo detector to avoid increase in optical coupling loss. Thus, in order to accomplish these demands, various techniques have been employed. For example, for a multi-core optical plastic connector which is used when coupling a plurality of optical fibers, in case of employing a structure having an intruding pin provided on one of connectors, while a fitting hole, in which the intruding pin is to be inserted, is provided on the other connector, a technique of enhancing precision of the bore diameter of the fitting hole by forming the fitting hole with metal or ceramic, and thus enhancing the positioning precision between fibers has been disclosed.

SUMMARY OF THE INVENTION

Generally, for optical position alignment between an optical fiber and a light-emitting element or a light-receiving element, high precision, such as a unit of several micron meters, is required. Such high precision position alignment is still difficult to attain even if employing the technique described above, and thus a technique enabling precise and easy optical position alignment is desired.

The present invention provide techniques, which enable optical position alignment in apparatus and components, which are used in optical communication, precisely and easily.

In order to accomplish the above, an aspect of the present invention provides a method of manufacturing an optical module, which includes a transparent substrate having an electro-optical element on one surface side and an optical transmission line support member, which is arranged on the other surface side of the transparent substrate and supports one end of an optical transmission line, the method of manufacturing the optical module including forming a guide pin in either the transparent substrate or the optical transmission line support member; forming a guide hole, in which the guide pin is to be inserted, in the other one of the transparent substrate and the optical transmission line support member, in which the guide pin is not formed, such that the diameter of the guide hole is made larger as compared with the diameter of the guide pin; arranging a jig having a protruding portion, which diameter is substantially the same as the diameter of the guide pin, so that the protruding portion is inserted into the guide hole; filling up the gap between the protruding portion and the guide hole with a filler material, which is cured by carrying out a predetermined processing; adjusting a position of the jig within a range in which the protruding portion is movable inside the guide hole; curing the filler material by carrying out the predetermined processing on the filler material, which is filled up in the gap between the protruding portion and the guide pin; and pulling out the protruding portion from the guide hole after having cured the filler material.

Thus, after having arranged the jig which has the protruding portion, for example, above the transparent substrate, the position of the jig is fine-adjusted according to the configuration of the electro-optical element, and then the filler material is cured to narrow the inner side of the guide hole after the fine adjustment, thereby enabling to form the guide hole with increasing the precision of the formation position, the size and the like. By inserting the guide pin into the guide hole, the mutual positioning of the transparent substrate and optical transmission line support member can be aligned with high precision. Therefore, enhancement of the optical coupling efficiency can be attained by aligning and arranging precisely and easily the mutual positions of the optical transmission line and the electro-optical element. Moreover, what is required for the size of the guide hole is a size, which is sufficient to adjust a position of the protruding portion provided to the jig. Thus there is another advantage that the formation becomes easy because the required precision for the formation position and the hole diameter decreases.

Moreover, the manufacturing method may further include mounting the optical transmission line support member on the transparent substrate such that the guide pin is inserted into the guide hole, in which the filler material is already cured. Accordingly, the optical module with sufficient optical coupling efficiency can be attained.

Moreover, an aspect of the present invention provides a method of manufacturing an optical module, which includes a transparent substrate having an electro-optical element on one surface side and an optical transmission line support member, which is arranged on the other surface side of the transparent substrate and supports one end of an optical transmission line, the method of manufacturing the optical module including forming the guide hole in either the transparent substrate or the optical transmission line support member; forming a fitting hole, into which a guide pin is to be fitted, in the other one of the transparent substrate and the optical transmission line support member, in which the guide pin is not formed, such that the diameter of the fitting hole is made larger as compared with the diameter of the guide pin; inserting a part of the guide pin into the fitting hole; filling up a gap between the guide pin and the fitting hole with a filler material, which is cured by carrying out a predetermined processing; adjusting a position of the guide pin within a range in which the guide pin can move inside the fitting hole; and curing the filler material by carrying out the predetermined processing on the filler material, which is filled up in the gap between the guide pin and the fitting hole.

After the guide pin are inserted into the fitting hole, the position of the guide pin is fine-adjusted according to the configuration and the like of the electro-optical element, and the filler material is cured after the fine adjustment. Therefore, the position of the guide pin can be determined precisely. Thus, by fitting the guide pin, whose position is determined in such a process, with the guide hole, the mutual positions of the transparent substrate and the optical transmission line support member can be adjusted with high precision. Therefore, enhancement of optical coupling efficiency can be attained by aligning and arranging precisely and easily the mutual positions of the optical transmission line and the electro-optical element. What is required for the size of the fitting hole is a size, which is sufficient to adjust a position of the guide pin. Thus there is another advantage that the formation is easy because the required precision for the formation position and the hole diameter decreases.

It is preferable that the above-described guide pin is inserted into the fitting hole such that, at least, a part of the guide pin is inserted into a guide pin holding hole by a jig having the guide pin holding hole, whose diameter is substantially the same as the diameter of the guide pin. This simplifies the manufacturing method.

Moreover, the method of manufacturing the optical module may further include mounting the optical transmission line support member on the transparent substrate, such that the guide pin, which is fixed in the fitting hole by having cured the filler material, is inserted into the guide hole. Accordingly, an optical module with sufficient optical coupling efficiency can be attained.

Moreover, an aspect of the present invention provides a method of manufacturing an optical module, which includes a transparent substrate having an electro-optical element on one surface side and an optical transmission line support member, which is arranged on the other surface side of the transparent substrate and supports one end of an optical transmission line, and each of the electro-optical element and the optical transmission line is arranged on each surface of the transparent substrate or on one surface of the transparent substrate, and coupled optically to each other with the optical coupling member and the like, which takes the role of optical coupling of the electro-optical element and the optical transmission line, the method of manufacturing the optical module including forming a guide pin in either the transparent substrate or the optical transmission line support member; forming a guide hole, in which the guide pin is to be inserted, on the other of the transparent substrate and the optical transmission line support member, in which the guide pin is not formed, such that the diameter of the guide hole is made larger to produce a gap therebetween when the guide pin is inserted into the guide hole; mounting the optical transmission line support member on the transparent substrate such that the guide pin is being inserted into the guide hole; filling up the gap between the guide pin and the guide hole with a filler material, which is cured by carrying out a predetermined processing; adjusting a position of the optical transmission line support member within a range in which the guide pin can move inside the guide hole; and curing the filler material by carrying out the predetermined processing on the filler material, which is filled up in the gap between the guide pin and the guide hole.

This configuration enables easy fine-adjustment of the mutual positions of the optical transmission line support member and the transparent substrate after having mounted the optical transmission line support member on the transparent substrate. Thereby the position after the fine adjustment can be determined by curing the filler material after the fine adjustment. Therefore, enhancement of optical coupling efficiency can be attained by aligning and arranging precisely and easily the mutual positions of an optical transmission line and an electro-optical element. Moreover, what is required for the size of the guide hole is a size, which is sufficient to adjust a position of the guide pin, and thus there is another advantage that formation is easy because the required precision for the formation position and the hole diameter decreases.

Moreover, an aspect of the present invention provides a method of manufacturing an optical module, which includes: a transparent substrate having an electro-optical element on one surface side; an optical transmission line support member, which is arranged on the other surface side of the transparent substrate and supports one end of an optical transmission line; and an optical coupling member, which is arranged on the other side surface of the transparent substrate and has a role of optical coupling of the electro-optical element with the optical transmission line, the method of manufacturing an optical module including forming a guide pin in either the optical transmission line support member or the optical coupling member; forming a guide hole, in which the guide pin is to be inserted, in the other one of the optical transmission line support member and the optical coupling member, in which the guide pin is not formed, such that the diameter of the guide hole is made larger to produce a gap therebetween when the guide pin is inserted into the guide hole; mounting the optical transmission line support member on the transparent substrate such that the guide pin is inserted into the guide hole; filling up the gap between the guide pin and the guide hole with a filler material, which is cured by carrying out a predetermined processing; adjusting a position of the optical transmission line support member within a range in which the guide pin can move inside the guide hole; and curing the filler material by carrying out the predetermined processing to the filler material, which is filled up in the gap between the guide pin and the guide hole.

This configuration enables easy fine-adjustment of the mutual positions of the optical transmission line support member and the optical coupling member after having mounted the optical transmission line support member on the transparent substrate. Thereby the position after fine adjustment can be determined by curing the filler material after the fine adjustment. Therefore, optical coupling efficiency can be enhanced by aligning precisely and easily the mutual positions of the optical transmission line and the electro-optical element. Moreover, what is required for the size of the guide pin is a size, which is sufficient to adjust a position of the guide pin, and thus there is another advantage that the formation is easy because the required precision for the formation position and the hole diameter decreases.

Moreover, the method of manufacturing an optical module may further include pulling out the guide pin from the guide hole after having cured the filler material. Accordingly, the guide hole, in which both the position precision and the hole diameter are formed with sufficient precision, can be obtained. This is preferable for a case that the one member, in which the guide pin is provided, and the other member, in which the hole is provided, are constituted detachably.

Moreover, the filler material may include either a thermosetting adhesive or an optically-cured adhesive. This enables carrying out the above predetermined processing by applying heat or light, and thus the filler material can be cured easily even under a case of the guide pin being inserted into the guide hole or the fitting hole.

Moreover, an aspect of the present invention provides the optical module manufactured using the above-described manufacturing method. Specifically, the optical module of an aspect of the invention has: a transparent substrate which has optical permeability to the wavelength of the light used; an electro-optical element, which is arranged on one surface side of the transparent substrate and radiates signal light toward the other surface side of the transparent substrate according to provided electrical signal, or which generates an electrical signal according to the luminous intensity of signal light provided from the other surface side of the transparent substrate; an optical transmission line support member, which is arranged on the other surface side of the transparent substrate and supports one end of an optical transmission line; and an optical coupling member, which is arranged on the other surface side of the transparent substrate and has a role of optical coupling between the electro-optical element and the optical transmission line. Either the transparent substrate or the optical transmission line support member has a guide pin therein, and the other one has a guide hole, in which the guide pin is to be inserted, and the diameter of the guide hole is made larger as compared with the diameter of the guide pin so that a gap is produced between the guide pin and the guide hole, and the gap between the guide pin and the guide hole is filled up with a predetermined filler material.

This configuration enables enhancement in precision of the mutual positions of the electro-optical element, the optical transmission line support member and the optical coupling member. In particular, what is required for the size of the guide hole is a size, which is sufficient to adjust a position of the protruding portion provided to the jig or the guide pin, and thus there is another advantage that the formation becomes easy because the required precision for the formation position and the hole diameter decreases.

The above-described optical transmission line support member supports the optical transmission line such that the extension direction of the optical transmission line becomes substantially parallel to the other surface side of the transparent substrate, and the optical coupling member has a reflective portion, which changes the course of signal light radiated from the electro-optical element by substantially 90 degrees to be guided to the optical transmission line, or which changes the course of signal light radiated from the optical transmission line by substantially 90 degrees to be guided to the electro-optical elemen. It is preferable that the guide pin is arranged to become substantially orthogonal to the other surface side of the transparent substrate. Accordingly, miniaturization of the optical module can be accomplished. Moreover, by arranging the guide pin substantially orthogonally, insertion into the guide hole and subsequent position alignment become easier.

Moreover, an optical module of an aspect of the present invention has: a transparent substrate, which has an optical permeability to the wavelength of the light used; an electro-optical element, which is arranged on one surface side of the transparent substrate and radiates signal light toward the other surface side of the transparent substrate according to provided electrical signal, or which generates electrical signal according to the luminous intensity of signal light provided from the other surface side of the transparent substrate; an optical transmission line support member, which is arranged on the other surface side of the transparent substrate and supports one end of an optical transmission line; and an optical coupling member, which is arranged on the other surface side of the transparent substrate and has a role of optical coupling between the electro-optical element and the optical transmission line. Either the optical transmission line support member or the optical coupling member has a guide pin therein and the other one has a guide hole, in which the guide pin is to be inserted, and the diameter of the guide hole is made larger as compared with the diameter of the guide pin so that a gap is produced between the guide pin and the guide hole, and the gap between the guide pin and the guide hole is filled up with a predetermined filler material.

This configuration enables enhancement in precision of the mutual positions of the electro-optical element, the optical transmission line support member and the optical coupling member. In particular, what is required for the size of the guide hole is a size, which is sufficient to adjust a position of the guide pin, and thus there is another advantage that the formation becomes easy because the required precision for the formation position and the hole diameter decreases.

The above-described optical transmission line support member supports the optical transmission line such that the extension direction of the optical transmission line becomes substantially parallel to the other surface side of the transparent substrate, and the optical coupling member has a reflective portion, which changes the course of signal light radiated from the electro-optical element by substantially 90 degrees to be guided to the optical transmission line, or which changes the course of signal light radiated from the optical transmission line by substantially 90 degrees to be guided to the electro-optical element, and the guide pin is arranged to become substantially parallel to the extension direction of the optical transmission line. Accordingly, miniaturization of the optical module can be accomplished.

Moreover, the above-described optical coupling member may have a lens, which converges signal light radiated from the electro-optical element to be guided to the reflective portion, or which converges signal light radiated from the optical transmission line and then reflected by the reflective portion to be guided to the electro-optical element. This further increases optical coupling efficiency.

Moreover, the optical coupling member may have a first lens, which turns signal light radiated from the electro-optical element into a parallel light to be guided to the reflective portion, or which converges signal light radiated from the optical transmission line and then reflected by the reflective portion to be guided to the electro-optical element, and a second lens, which converges signal light radiated from the electro-optical element and then reflected by the reflective portion to be guided to the optical transmission line, or which turns signal light radiated from the optical transmission line into a parallel light to be guided to the reflective portion. This further increases optical coupling efficiency.

Moreover, an optical coupling member may further have a third lens, which turns signal light radiated from the electro-optical element into a parallel light to be guided to the reflective portion, or which converges signal light radiated from the optical transmission line and then reflected by the reflective portion to be guided to the electro-optical element, and that the optical transmission line support member further has a fourth lens, which converges signal light radiated from the electro-optical element and then reflected by the reflective portion to be guided to the optical transmission line, or which turns signal light radiated from the optical transmission line into a parallel light to be guided to the reflective portion. This further increases optical coupling efficiency.

Moreover, the above-described reflective portion may have a metal film or a dielectric multilayer film. This increases reflective efficiency.

Moreover, an aspect of the present invention is also a hybrid integrated circuit having the above-described optical module, and also a hybrid circuit board. In the specification, the "hybrid integrated circuit" refers to an integrated circuit having a portion, which has a role of processing an electrical signal, and a portion, which has a role of processing an optical signal. Such a hybrid integrated circuit is used, for example, in information communication (data communication) between chips or between circuit boards in various kinds of electronic apparatuses. Moreover, in the specification, the "hybrid circuit board" refers to a circuit board having both circuit wiring, which has a role of transmission of electrical signal, and an optical transmission line, which has a role of transmission of optical signal, and includes the above-described optical module or the hybrid integrated circuit including the optical module.

Moreover, an aspect of the present invention is also an electronic apparatus having the above-described optical module. In more detail, the electronic apparatus of an aspect of the invention also includes a case that includes the above-described hybrid integrated circuit or the circuit board, which includes the optical module, as well as the case that includes the above-described optical module itself. In the specification, the "electronic apparatus" refers to the general apparatus, which realizes a certain function using an electronic circuit and the like. Therefore, there is no specific limitation to its configuration. But various apparatus, for example, such as a personal computer, a PDA (personal digital assistant), an electronic notebook and the like are included. The optical modules, the hybrid integrated circuits, or the circuit boards according to an aspect of the present invention can be used in information communication inside the apparatus of these electronic apparatus and information communication to and from the external apparatuses and the like.

Moreover, an aspect of the present invention provides a method of manufacturing an opto-electricity mixed device, which includes a circuit board having a conductive film having a role of transmitting an electrical signal and an optical transmission line having a roll of transmitting a signal light, and a hybrid integrated circuit chip, which is coupled to the circuit board and has a role of conversion between the electrical signal and the signal light, the method of manufacturing the opto-electricity mixed device including forming a guide pin in either the hybrid integrated circuit chip or the circuit board; forming a guide hole in the other one of the hybrid integrated circuit chip or the circuit board, in which the guide pin is to be inserted, such that the diameter of the guide hole is made larger as compared with the diameter of the guide pin; arranging a jig having a protruding portion, whose diameter is substantially the same as the diameter of the guide pin, on top of the circuit board so that the protruding portion is being inserted into the guide hole; filling up the gap between the protruding portion and the guide hole with a filler material, which is cured by carrying out a predetermined processing; adjusting a position of the jig within a range in which the protruding portion can move inside the guide hole; curing the filler material by carrying out the predetermined processing on the filler material, which is filled up in the gap between the protruding portion and the guide pin; and pulling out the protruding portion from the guide hole after having cured the filler material.

Moreover, an aspect of the present invention provides a method of manufacturing an opto-electricity mixed device, which includes a circuit board having a conductive film having a role of transmitting electrical signal and an optical transmission line having a roll of transmitting a signal light, and a hybrid integrated circuit chip, which is coupled to the circuit board and has a role of conversion between the electrical signal and the signal light, the method of manufacturing the opto-electricity mixed device including forming a guide pin in either the hybrid integrated circuit chip or the circuit board; forming a guide hole in the other one of the hybrid integrated circuit chip and the circuit board, in which the guide pin is to be inserted, and whose diameter is made larger so that a gap is produced between the guide pin and the guide hole when the guide pin is inserted into the guide hole; mounting the hybrid circuit board on top of the circuit board such that the guide pin is inserted into the guide hole; filling up the gap between the guide pin and the guide hole with a filler material, which is cured by carrying out a predetermined processing; adjusting a position of the hybrid integrated circuit chip within a range in which the guide pin can move inside the guide hole; and curing the filler material by carrying out the predetermined processing to the filler material, which is filled up in the gap between the guide pin and the guide hole.

This configuration enables precise and easy alignment of the mutual positions of the optical transmission line and the hybrid integrated circuit chip, which the circuit board has, and thus the enhancement of the optical coupling efficiency can be attained. Moreover, what is required for the size of the guide hole is a size, which is sufficient to adjust a position of the protruding portion provided to the jig or the guide pin, and thus there is another advantage that the formation becomes easy because the required precision for the formation position and the hole diameter decreases.

The above-described hybrid integrated circuit chip includes a transparent substrate having optical permeability to the wavelength of the light used, and an electro-optical element, which is arranged on one surface side of the transparent substrate and radiates signal light toward the other surface side of the transparent substrate according to provided electrical signal, or which generates an electrical signal according to the luminous intensity of signal light provided from the other surface side of the transparent substrate. It is preferable that either the guide pin or the guide hole is formed on the transparent substrate.

Moreover, an aspect of the present invention is also an opto-electricity mixed device manufactured using the above-described manufacturing method. Specifically, the opto-electricity mixed device of an aspect of the invention includes a circuit board having a conductive film having a role of transmitting electrical signal and an optical transmission line having a roll of transmitting signal light, and a hybrid integrated circuit chip, which is coupled to the circuit board and has a role of conversion between the electrical signal and signal light, either the circuit board or the hybrid integrated circuit chip having a guide pin, and the other one having a guide hole, in which the guide pin is to be inserted, whose diameter is made larger as compared with the diameter of the guide pin so that a gap is produced between the guide pin and the guide hole, and, the gap between the guide pin and the guide hole is filled up with a predetermined filler material.

This configuration enables precise and easy alignment of the mutual positions of the optical transmission line and the hybrid integrated circuit chip, which the circuit board has, and thus enhancement of the optical coupling efficiency can be attained. Especially, what is required for the size of the guide hole is a size, which is sufficient to adjust a position of the protruding portion provided to the jig or the guide pin, and thus there is another advantage that the formation becomes easy because the required precision for the formation position and the hole diameter decreases.

The above-described hybrid integrated circuit chip includes a transparent substrate, which has optical permeability to the wavelength of the light used, an electro-optical element, which is arranged on one surface side of the transparent substrate and radiates signal light toward the other surface side of the transparent substrate according to the provided electrical signal, or which generates electrical signal according to the luminous intensity of signal light provided from the other surface side of the transparent substrate, and it is preferable that the guide pin or the guide hole is formed on the transparent substrate.

DETAILED DESCRIPTION OF EXEMPLARY EMBODIMENTS

Hereinafter, the exemplary embodiments of the present invention will be described referring to the accompanying figures.

First Exemplary Embodiment

Figure 1A:
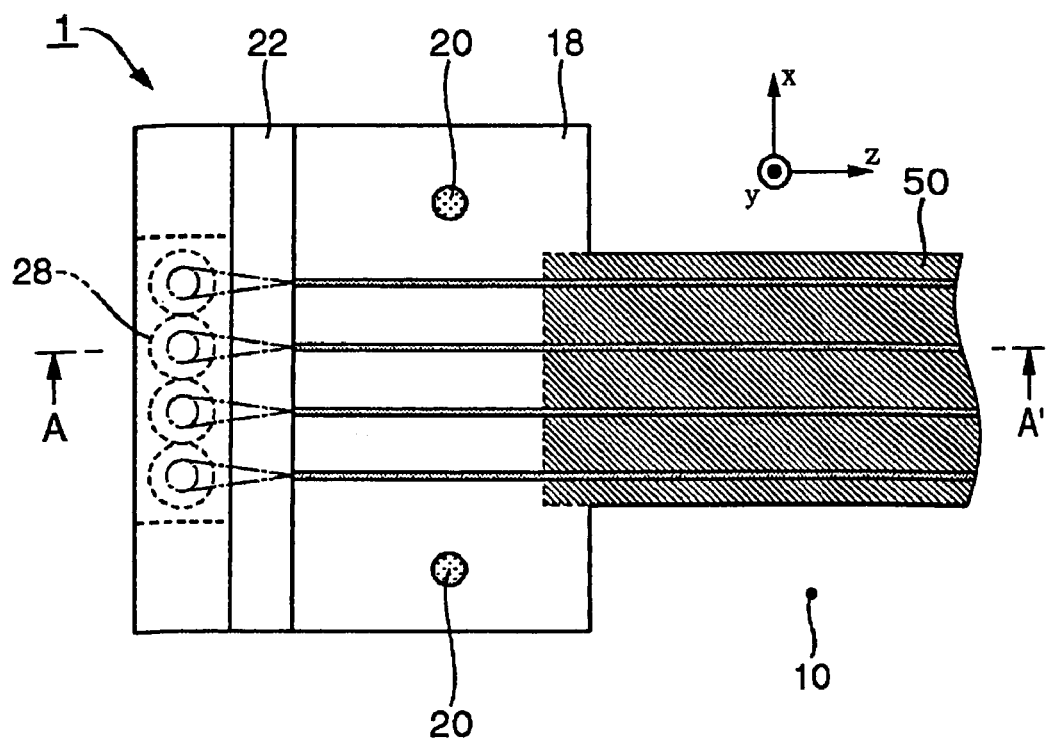
FIGS. 1(A) and 1(B) are schematics explaining a configuration of an optical module according to one exemplary embodiment.
Figure 1B:
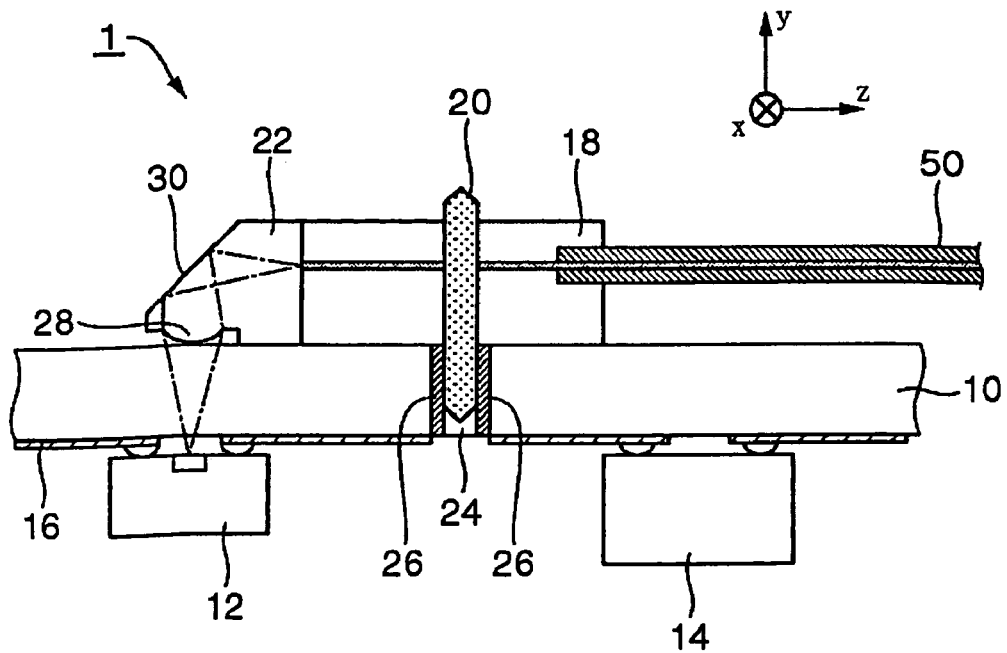

FIG. 1 is a view explaining a configuration of an optical module (opto-electric transmission line conversion connector) of the exemplary embodiment. FIG. 1(A) shows a plan view of the optical module of the exemplary embodiment. FIG. 1(B) shows a sectional view taken along the A–A' plane of FIG. 1(A). In addition, in FIG. 1(B), in order to describe a structure of a guide pin 20 (described hereinafter in detail) and its vicinity, such a region is shown by replacing the sectional view taken along the A–A' plane.

The optical module 1 shown in FIG. 1 includes a transparent substrate 10, an electro-optical element 12, an electronic circuit 14, a wiring film 16, a fiber support member 18, a guide pin 20, and an optical coupling member 22.

The transparent substrate 10 has optical permeability to the wavelength of the light used, and supports each element, which constitutes the optical nodule 1. For example, in a case that the wavelength of light radiated from the electro-optical element 12 or light received by the electro-optical element 12 is that of visible light or near the wavelength thereof (for example, 850 nm), it is preferable to constitute the transparent substrate 10 with material, such as glass and plastic. Moreover, in a case that the wavelength of radiated light is relatively long (for example, 1300 nm to 1500 nm), the transparent substrate 10 can be constituted with material, such as silicon and germanium.

Moreover, the transparent substrate 10 has guide holes 24, in which the guide pin 20 which is used to determine the position of the fiber support member 18 is to be inserted. The diameter of the guide hole 24 is formed a little larger as compared with the diameter of the guide pin 20, such that a certain amount of gap is provided between the guide pin 20 and the hole 24 when the guide pin 20 is inserted. Then, between the guide pin 20 and the guide hole 24, an adhesive 26 as a filler material, which fills the gap therebetween, is filled up. The adhesive 26 is used as an adjustment member to adjust the mounting position of the fiber support member 18, and will be described below.

The electro-optical element 12 radiates an optical signal according to the driving signal provided from the electronic circuit 14, or generates an electrical signal according to the luminous intensity of the received signal light, and is arranged at a predetermined position on one surface side of the transparent substrate 10 such that a light-emitting surface or a light-receiving surface is directed toward the transparent substrate 10 side. The light-emitting surface or the light-receiving surface of the electro-optical element 12 is arranged inside an opening provided on the wiring film 16 on the transparent substrate 10, so that signal light is radiated or incident through the opening and the transparent substrate 10. For example, when the optical module 1 shown in FIG. 1, is used as the information transmitting side, a light-emitting element, such as a VCSEL (surface emission laser), is used as the electro-optical element 12. When the optical module 1 is used as the information receiving side, the light-receiving element, such as photo diode, is used as the electro-optical element 12. Although the electro-optical element array is constituted with four electro-optical elements 12, the number of the electro-optical element 12 is not be limited to such a case.

The electronic circuit 14 includes a driver and the like to drive the electro-optical element 12, and is arranged at a predetermined position on the transparent substrate 10. The electronic circuit 14 is coupled to the electro-optical element 12 through the wiring film 16 constituted on the transparent substrate 10, and further coupled to other circuit elements, circuit chips, external apparatuses and the like (not shown), as required.

The wiring film 16 is formed on the top surface of the transparent substrate 10 using conductor films, such as copper and the like, and is patterned into a predetermined shape. The wiring film 16 performs mutual electric coupling of the electro-optical element 12, the electronic circuit 14, other circuit elements and the like, as described above.

The fiber support member (optical transmission line support member) 18 supports a tape fiber 50 as an optical transmission line such that its extension direction becomes substantially parallel to the top surface of the transparent substrate 10, and is arranged detachably on the top surface of the transparent substrate 10. Although the exemplary embodiment shows the tape fiber 50 having four cores, it is not limited to such a case. The tape fiber may have any desired number of cores (including one core). The fiber support member 18 may be made of any suitable material, such as glass and plastic. Moreover, although the tape fiber, constituted in the shape of a film, is shown as an example of the optical transmission line, there is no intention to limit to the optical transmission line in such a case, but an optical transmission line, such as other general optical fibers, can be employed.

The guide pin 20 is a bar member and may be made of any suitable material, such as metal and the like, and is supported by the fiber supporting member 18. The guide pin 20 is used to determine the position of the fiber supporting member 18 by fitting with the guide hole 24 provided in the transparent substrate 10.

The optical coupling member 22 is provided attain optical coupling between the electro-optical element 12 and the tape fiber 50 supported by the fiber supporting member 18, and has a plurality of lenses 28 and a reflective portion 30. The lens 28 converges signal light radiated from each electro-optical element 12 to be guided to the reflective portion 30, or converges signal light radiated from the tape fiber 50 to be guided to the electro-optical element 12. The reflective portion 30 changes the course of signal light substantially by 90 degrees to be guided to the tape fiber 50, or changes the course of signal light radiated from the tape fiber 50 substantially by 90 degrees to be guided to the electro-optical element 12. The optical coupling member 22 may be made of any suitable material, such as glass and plastic. After having determined the position of the fiber supporting member 18, the optical coupling member 22 and the fiber support member 18 are adhered to be fixed. Moreover, it is preferable that the reflective portion 30 is formed using metal film or dielectric multilayer film.

The optical module 1 of the exemplary embodiment has such a configuration. And a method of mounting the fiber supporting member 18 on the transparent substrate 10 will be described.

FIG. 2 is a view explaining a method of mounting the fiber supporting member 18. In this view, the vicinity of the guide hole 24 in the transparent substrate 10 is shown.

Figure 2A:
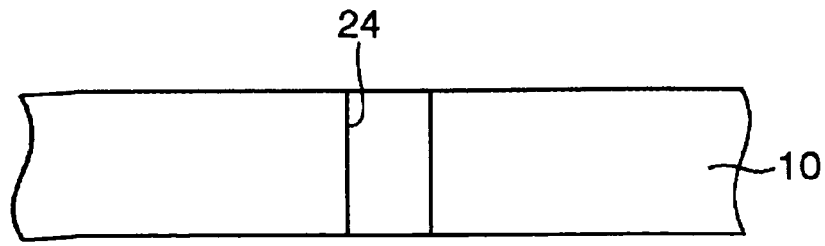
FIGS. 2(A)–2(D) are schematics explaining a method of mounting a fiber supporting member.

First, as shown in FIG. 2(A), the guide hole 24 is formed in the transparent substrate 10. At this time, the guide hole 24 is formed such that its diameter becomes larger as compared with the diameter of the guide pin 20, which is to be inserted afterward.

Figure 2B:
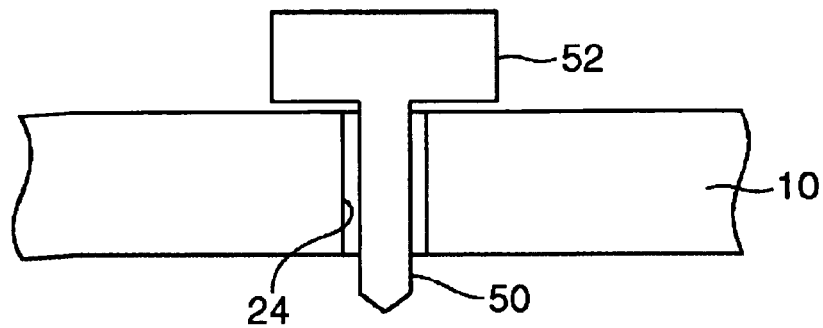

Next, as shown in FIG. 2(B), a jig 52 having a protruding portion 50, with a diameter substantially the same as the diameter of the guide pin 20, is arranged on top side of the transparent substrate 10 such that the protruding portion 50 is inserted into the guide hole 24. As for the jig 52, the diameter and the arranging interval of the protruding portion 50 are controlled and formed with high precision so that the position, in which the guide pin 20 should be inserted, can be precisely determined. The diameter of the protruding portion 50 may be conveniently made slightly larger than the diameter of the guide pin 20 within a range of allowable precision.

Figure 2C:
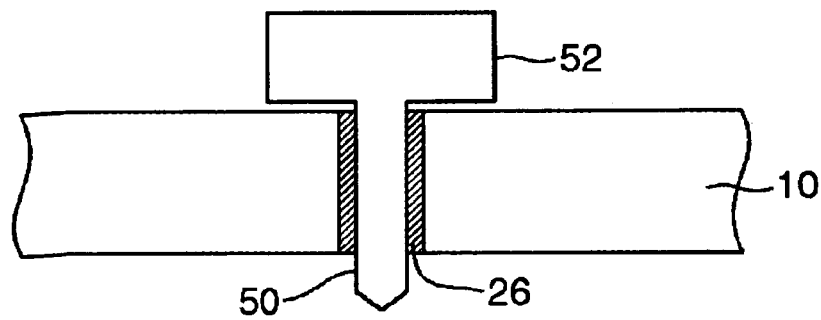

Next, as shown in FIG. 2(C), a gap between the guide hole 24 and the protruding portion 50 of the jig 52 is filled up with the adhesive 26 by using a dispenser and the like. At this time, as for the adhesive 26, the adhesive, such as an optically-cured adhesive, which is cured by irradiating light, a thermosetting adhesive, which is cured by applying heat, and the like, which is cured by carrying out a certain predetermined processing afterward, are used. For example, according to the exemplary embodiment, an UV-cured adhesive, which is cured by irradiating ultraviolet rays (UV irradiation), is used.

Figure 2D:
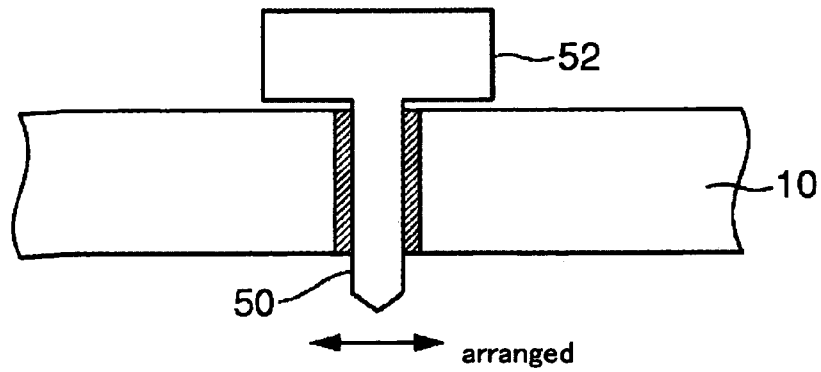

Next, as shown in FIG. 2(D), the position adjustment of the protruding portion 50 (positioning of the jig 52) is conducted. By setting the fiber core in the tape fiber 50, which is supported by the fiber supporting member 18, as the position reference, the position adjustment is conducted, for example, by aligning a reference mark (not shown) and the like provided on the jig 52 with the electro-optical element 12 so as to attain high optical coupling efficiency between the electro-optical element 12 and the tape fiber 50.

Figure 3A:
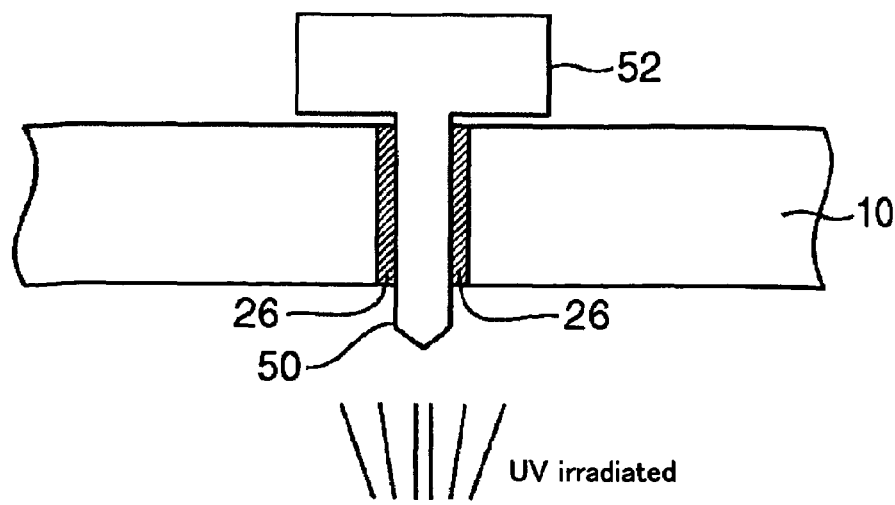
FIGS. 3(A) and 3(B) are schematics explaining a method of mounting a fiber supporting member.

Next, as shown in FIG. 3(A), the adhesive 26 is cured by irradiating ultraviolet rays to the adhesive 26. Accordingly, while the bore of the guide hole 24 is narrowed, the central position thereof is preferably formed with high precision to determine the position of the fiber supporting member 18 using the guide pin 20.

Figure 3B:
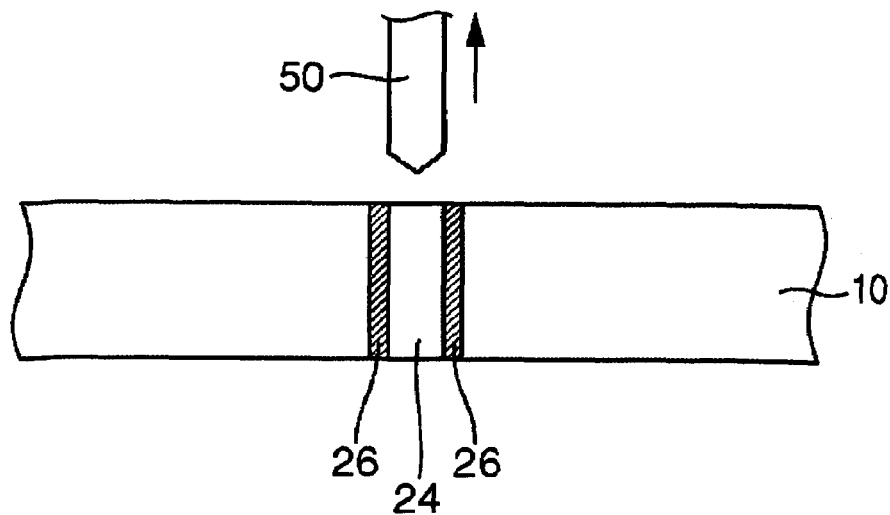

Next, as shown in FIG. 3(B), the protruding portion 50 is pulled out from the guide hole 24 after having cured the adhesive 26. Then, the above-described optical module 1, shown in FIG. 1, is obtained by mounting the fiber supporting member 18 on the transparent substrate 10 with the guide pin 20 inserted into the guide hole 24.

According to the exemplary embodiment, after having arranged the jig 52, having the protruding portion 50 on top of the transparent substrate 10, the position of the jig 52 is fine-adjusted according to the arrangement and the like of the electro-optical element 12, and after the fine adjustment, the inner side of the guide hole 24 is narrowed by curing the adhesive 26. This enables forming the guide hole 24 with high precision. By inserting the guide pin 20 into the guide hole 24, high precision alignment of the mutual positions of the transparent substrate 10 and the optical fiber support member 18 becomes possible. Therefore, enhancement of optical coupling efficiency can be attained by aligning and arranging precisely and easily the mutual positions of the optical transmission line and the electro-optical element 12. Moreover, what is required for the size of the guide hole 24 is a size, which is sufficient to adjust a position of the protruding portion 50 of the jig 52. Thus there is another advantage that the formation becomes easy because the required precision for the formation position and the hole diameter decreases.

According to the above-described exemplary embodiment, the guide pin 20 is provided in the fiber supporting member 18, and the guide hole 24 is provided in the transparent substrate 10. However, the same action and effect can be attained, even if the guide pin 20 is provided in the transparent substrate 10 and the guide hole 24 is provided in the fiber supporting member 18.

According to the above-described exemplary embodiment, the guide hole 24 is formed by using the jig 52 having the protruding portion 50. However, it is also possible to form the guide hole 24 directly using the guide pin 20 provided to the fiber supporting member 18 without using the jig 52. Specifically, this can be conducted as follows.

First, in the above-described process in FIG. 2(B), instead of using the jig 52, the fiber supporting member 18 is mounted on the transparent substrate 10 so as to insert the guide pin 20 into the guide hole 24. Next, like the process shown in FIG. 2(C), the adhesive 26, which is cured by carrying out a predetermined processing, is filled into the gap between the guide pin 20 and the guide hole 24. And then, like the process shown in FIG. 2 (D), the position adjustment of the fiber supporting member 18 is conducted within a range in which the guide pin 20 can move within the guide hole 24. Then, like the process shown in FIG. 3(A), the adhesive 26 is cured by carrying out the predetermined processing to the adhesive 26, which is filled up in the gap between the guide pin 20 and the guide hole 24.

After having mounted the optical transmission line support member 18 on the transparent substrate 10, the mutual positions of the optical transmission line support member 18 and the transparent substrate 10 are fine-adjusted. Then by determining the position after the fine adjustment by curing the adhesive 26, enhancement of the precision of the mutual positions of the transparent substrate 10, the fiber supporting member 18, and the optical coupling member 22 can be attained. Therefore, the optical coupling efficiency can be enhanced by aligning precisely and easily the mutual positions of the optical transmission line and the electro-optical element 12. Moreover, what is required for the size of the guide hole 24 is a size, which is sufficient to adjust a position of the guide pin 20, and thus there is another advantage that the formation becomes easy because the required precision for the formation position and the hole diameter decreases.

As for the configuration of the optical module, besides the one shown in FIG. 1, various exemplary embodiments of the configuration can be conceivable. Hereinafter, other exemplary embodiments of the configuration of the optical module will be described.

Figure 4A:
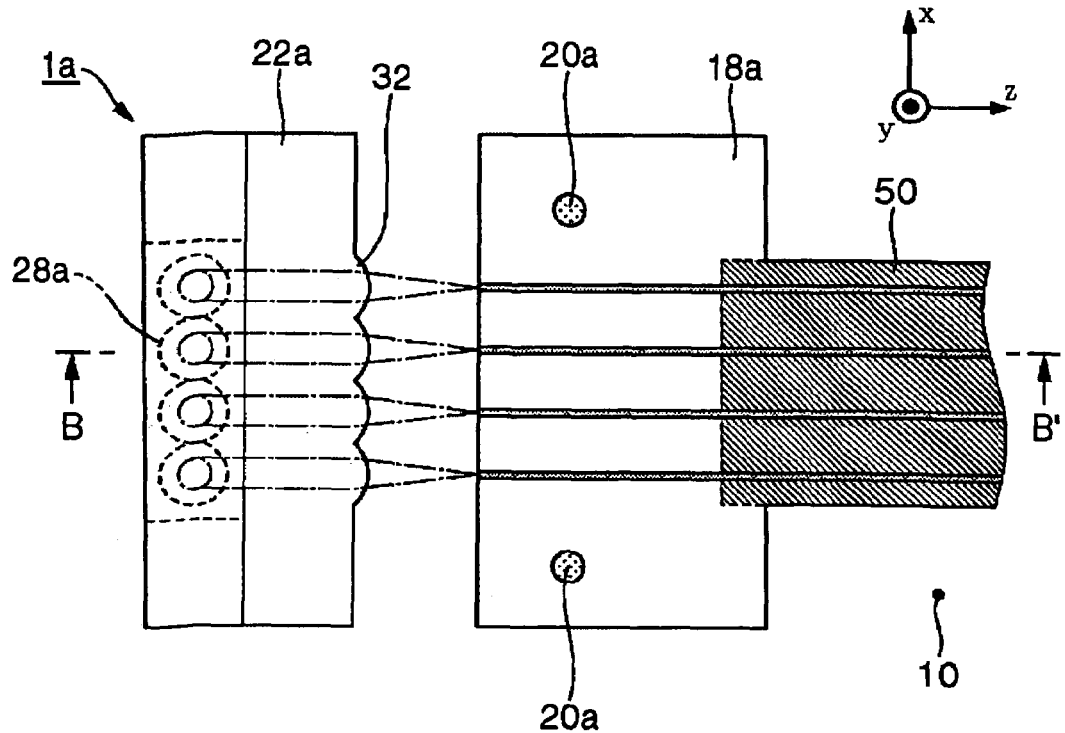
FIGS. 4(A) and 4(B) are schematics explaining another exemplary embodiment of a configuration of an optical module.
Figure 4B:
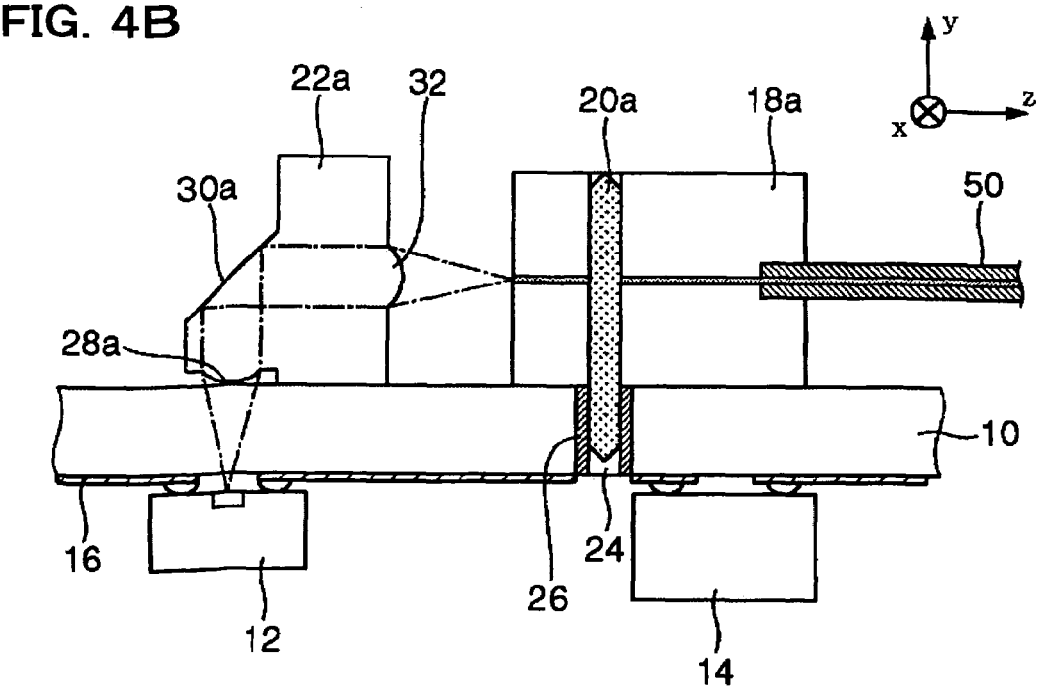

FIG. 4 is a view explaining another exemplary embodiment of a configuration of the optical module. FIG. 4(A) shows a plan view of an optical module 1a. FIG. 4(B) shows a sectional view taken along the B–B' plane shown in FIG. 4(A). In FIG. 4 (B), in order to describe a structure of a guide pin 20a and its vicinity, such a region is shown by replacing the sectional view taken along the B–B' plane. Because the optical module 1a shown in FIG. 4 has, basically, the same configuration as the above described optical module 1 shown in FIG. 1, the difference there between will be described mainly hereinafter.

As for the optical module 1a shown in FIG. 4, a fiber supporting member 18a and an optical coupling member 22a are separately arranged on the transparent substrate 10. The fiber supporting member 18a has a guide pin 20a, and the position is determined by inserting the guide pin 20a into the guide hole 24. The position of the fiber supporting member 18a is determined as in the above-described exemplary embodiment.

An optical coupling member 22a has a lens 28a, a reflective portion 30a, and a lens 32. The function of the lens 28a and the reflective portion 30a are the same as that of the lens 28 and the reflective portion 30 described above, respectively. The lens 32 turns signal light radiated from the electro-optical element 12 into a parallel light to be guided to the reflective portion 30a, or converges signal light radiated from the tape fiber 50 and reflected by the reflective portion 30a to be guided to the electro-optical element 12. The optical coupling member 22a is adhered to the transparent substrate 10.

Even in such a configuration, the position is determined after having fine-adjusted the mutual positions of the fiber supporting member 18a and the transparent substrate 10. Therefore, enhancement of the precision of the mutual positions of the transparent substrate 10, the fiber supporting member 18a, and the optical coupling member 22a can be attained. Accordingly, optical coupling efficiency can be enhanced by aligning precisely and easily the mutual positions of the optical transmission line and the electro-optical element 12. The same action and effect can be attained, even if the guide pin 20a is provided in the transparent substrate 10a and the guide hole 24a is provided in the fiber supporting member 18a.

Figure 5A:
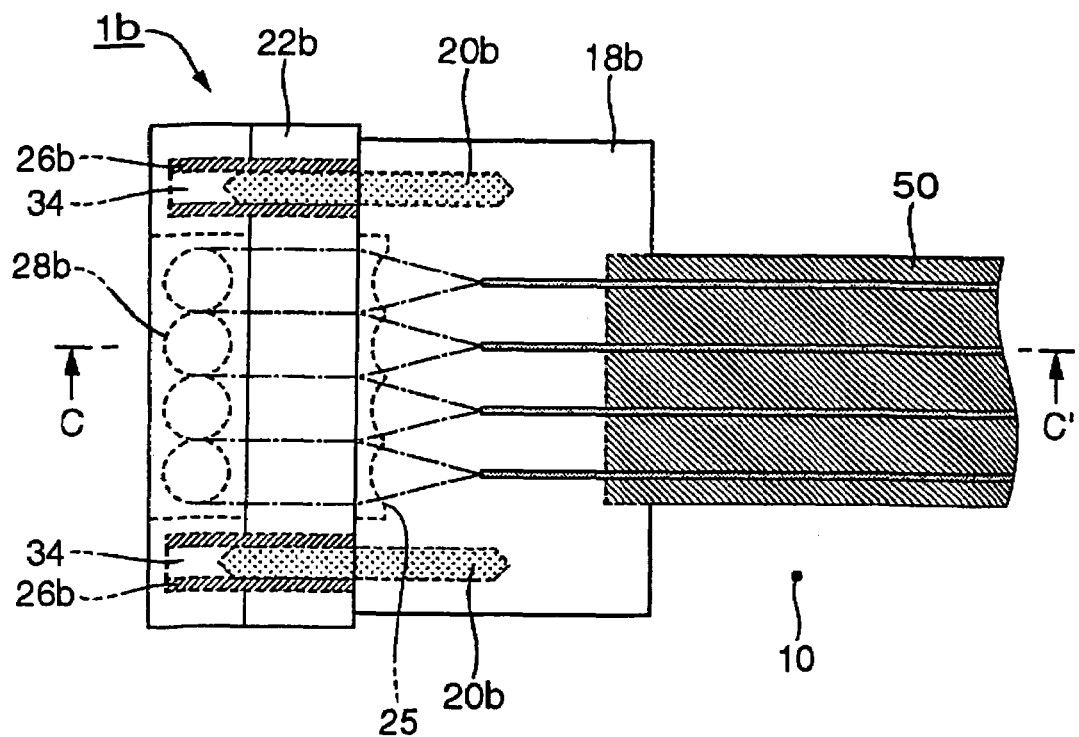
FIGS. 5(A) and 5(B) are schematics explaining another exemplary embodiment of a configuration of an optical module.
Figure 5B:
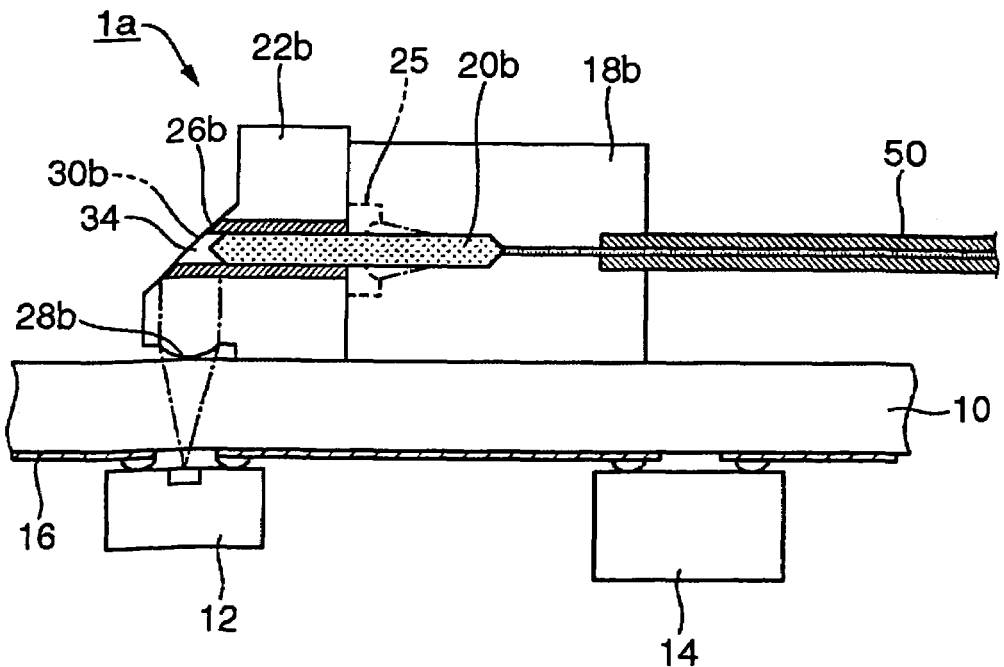

FIG. 5 is a view explaining another exemplary embodiment of a configuration of the optical module. FIG. 5(A) shows a plan view of an optical module 1b. FIG. 5(B) shows a sectional view taken along the C–C' plane shown in FIG. 5(A). In FIG. 5 (B), in order to describe the structure of a guide pin 20b and its vicinity, such a region is shown by replacing the sectional view taken along the C–C' plane. Because the optical module 1b shown in FIG. 5 has, basically, the same configuration as the optical module 1 shown in FIG. 1, the difference therebetween will be described mainly.

As for the optical module 1b shown in FIG. 5, a fiber supporting member 18b and an optical coupling member 22b are arranged on the transparent substrate 10. The position of the fiber supporting member 18b is determined by using the guide pin 20b, which is arranged substantially in parallel with the extension direction of the tape fiber 50, and by inserting the guide pin 20b into a guide hole 34 provided in the optical coupling member 22b. The position of the fiber supporting member 18b is determined as in the above-described exemplary embodiment.

The optical coupling member 22b has a lens 28b, a reflective portion 30b, and a guide hole 34, and is being adhered to fix to the transparent substrate 10. The gap between the guide hole 34 and the guide pin 20b is filled up with an adhesive 26b. In the exemplary embodiment, a lens 25, which converges signal light radiated from the electro-optical element 12 and reflected by the reflective portion 30b to be guided to the tape fiber 50, or turns signal light radiated from the tape fiber 50 into a parallel light to be guided to the reflective portion 30b, is arranged on one end of the fiber supporting member 18b.

Even in such a configuration, the position is determined after having fine-adjusted the mutual positions of the fiber supporting member 18b and the optical coupling member 22b. Therefore, enhancement of the precision of the mutual positions of the transparent substrate 10, the fiber supporting member 18b, and the optical coupling member 22b can be attained. Accordingly, optical coupling efficiency can be enhanced by aligning precisely and easily the mutual positions of the optical transmission line and the electro-optical element 12. The same action and effect can be attained, even if the guide pin 20b is provided in the optical coupling member 22b and the guide hole 34 is provided in the fiber supporting member 18b.

Second Exemplary Embodiment

Next, a hybrid integrated circuit (opto-electricity mixed integrated circuit) constituted using the optical module in the above described exemplary embodiment, and a hybrid circuit board constituted using the hybrid integrated circuit will be described.

Figure 6:
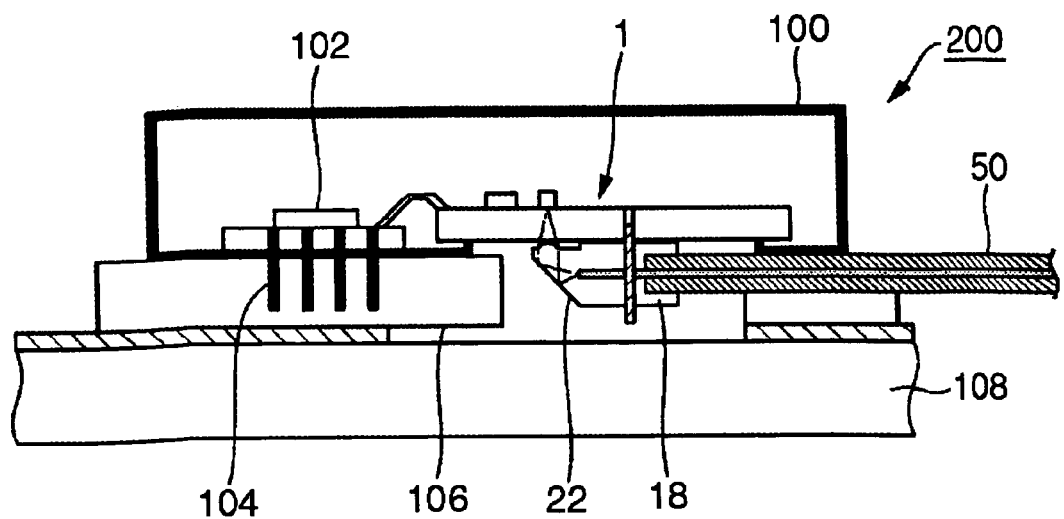
FIG. 6 is a schematic explaining an exemplary embodiment of configuration of a hybrid integrated circuit and a hybrid integrated board including the hybrid integrated circuit.

FIG. 6 is a view explaining an exemplary embodiment of a configuration of a hybrid integrated circuit and a hybrid circuit board including the hybrid integrated circuit. A hybrid circuit board 200 shown in this view includes a hybrid integrated circuit 100 including the optical module 1 (or 1a, 1b) according to the exemplary embodiments described above, and a wiring board 108.

The hybrid integrated circuit 100 includes the optical module 1 and a signal-processing chip 102, and has a structure which moulds and integrates both with plastic and the like. The optical module 1 and the signal-processing chip 102 are coupled electrically by wire bonding. The optical module 1 is arranged so as to direct the exit direction of the exiting light from the electro-optical element toward the wiring board 108 side. An optical coupling member 22 provided to the optical module 1 is exposed out of mould resin, and is ready to be able to couple the fiber supporting member 18. The wiring substrate 108 has a wiring film formed on the top thereof, in which the hybrid integrated circuit 100 is mounted. A socket 106 is arranged on the top surface of the wiring board 108, and the hybrid integrated circuit 100 is fixed by inserting a pin grid array (PGA) 104 provided to the hybrid integrated circuit 100 into the socket 106. The hybrid integrated circuit 100 and the hybrid circuit board 200 according to the exemplary embodiment can be applied to various kinds of electronic apparatus, such as a personal computer and the like, and can be used for information communication within apparatus and information communication to and from the external apparatuses and the like.

Figure 7:
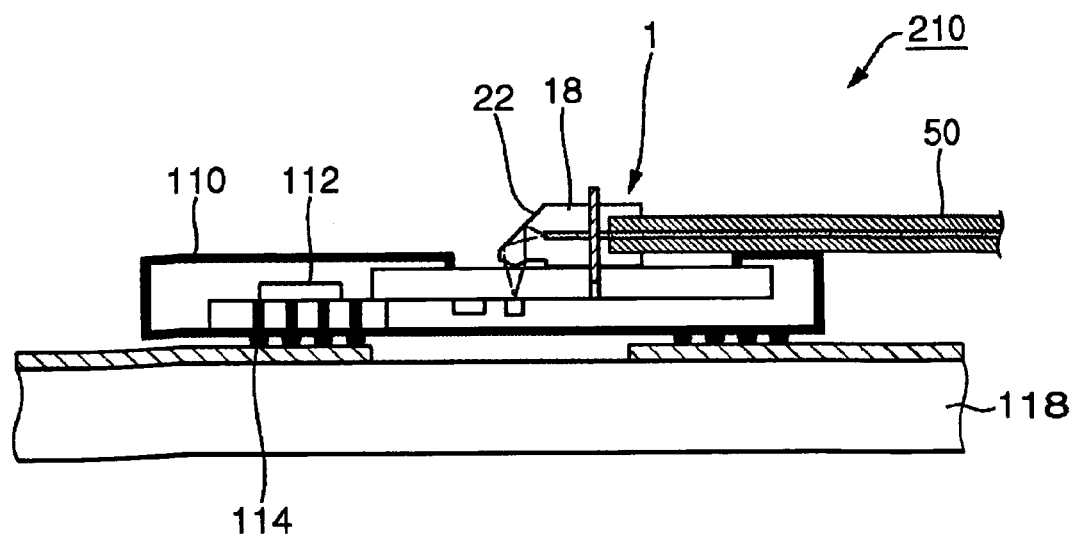
FIG. 7 is a view explaining another exemplary embodiment of a configuration of a hybrid integrated circuit and a hybrid circuit board including the hybrid integrated circuit.

FIG. 7 is a view explaining another exemplary embodiment of a configuration of a hybrid integrated circuit and a hybrid circuit board including the hybrid integrated circuit. A hybrid circuit board 210 shown in this view includes a hybrid integrated circuit 110 including the optical module 1 (or 1a, 1b) according to the exemplary embodiments described above, and a wiring board 118.

The hybrid integrated circuit 110 includes the optical module 1 and a signal-processing chip 112, and has a structure which moulds and integrates both with plastic and the like. The optical module 1 is arranged so as to direct the exit direction of the exiting light from the light-emitting element toward the opposite to the wiring board 108 side. The optical coupling member 22 provided to the optical module 1 is exposed out of mould resin, and is ready to be able to couple the fiber supporting member 18. The wiring substrate 118 has a wiring film formed on the top thereof, in which the hybrid integrated circuit 110 is mounted. The hybrid integrated circuit 110 is coupled to the wiring substrate 118 via a ball grid array (BGA) 114. The hybrid integrated circuit 110 and the hybrid circuit board 210 according to the exemplary embodiment can be applied to various kinds of electronic apparatus, such as a personal computer and the like, and can be used for information communication within apparatus and information communication to and from the external apparatuses and the like.

Third Exemplary Embodiment

Next, an opto-electricity mixed device, which has a structure similar to the hybrid circuit board according to the above-described second exemplary embodiment, will be described.

Figure 8:
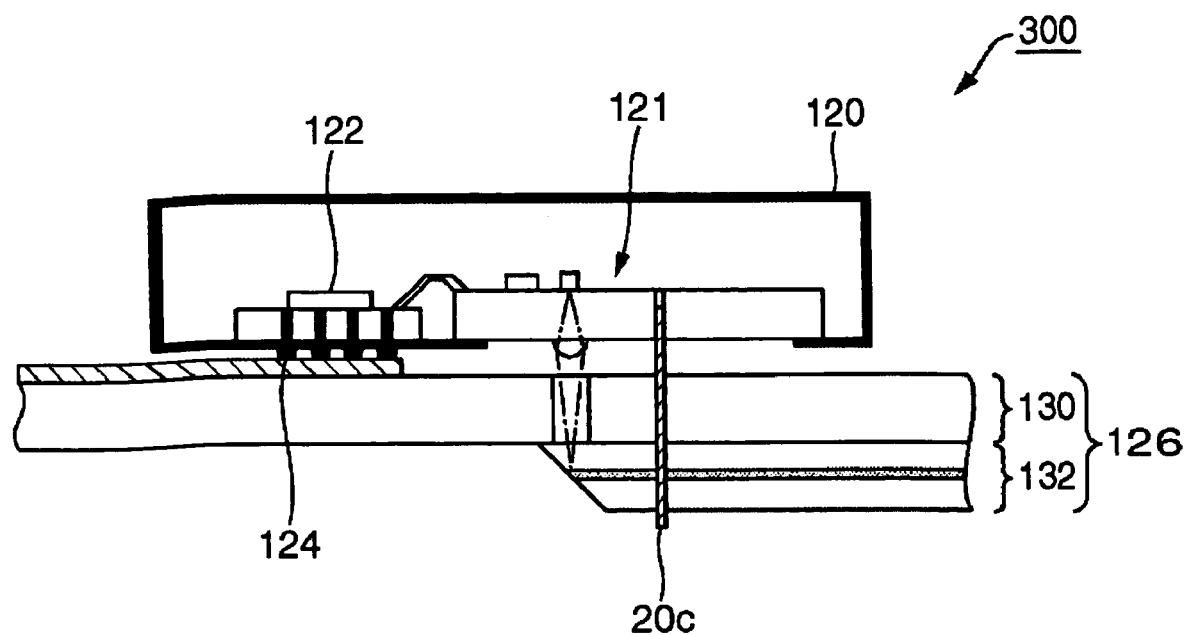
FIG. 8 is a view explaining a configuration of an opto-electricity mixed device.

FIG. 8 is a view explaining a configuration of an opto-electricity mixed device 300 according to a third exemplary embodiment. An opto-electricity mixed device 300 shown in this view includes a hybrid integrated circuit chip 120 and a circuit board 126.

The hybrid integrated circuit 120 includes an optical module 121 and a signal-processing chip 122, and has a structure which moulds and integrates the both with plastic and the like. The optical module 121 and the signal-processing chip 122 are coupled electrically by wire bonding. The optical module 121 has a structure which excludes the fiber supporting member 18 and the optical coupling member 22 from the optical module 1 (refer to FIG. 1) in the above-described exemplary embodiment, and is arranged so as to direct the exit direction of the exiting light from the electro-optical element 12 toward the circuit board 126. The optical module 121 includes a transparent substrate, which has optical permeability to the wavelength of the light used, and the electro-optical element 12 arranged on one side of the transparent substrate. Then, by inserting a guide pin 20c into the guide hole provided on the circuit board 126 as well as filling therebetween with an adhesive (filler material), as in the case of the above-described exemplary embodiments, the position between the optical module 121 and the circuit board 126 is adjusted.

The circuit board 126 includes a wiring substrate 130 having a conductive film, which has a role of transmission of electrical signal, formed on the top surface thereof, and an optical transmission line (optical waveguide) 132, which transmits of light information. The optical transmission line 132 has a role of transmitting the optical signal radiated from the electro-optical element, which is included in the hybrid integrated circuit chip 120, to other apparatus, modules and the like (not shown). The optical transmission line 132 has a reflection mirror formed at an end portion thereof, and the course of the optical signal radiated from the light-emitting element is changed by substantially 90 degrees by the reflection mirror to be incident to the optical transmission line 132. The course of the optical signal transmitted through the optical transmission line 132 is changed by substantially 90 degrees by the reflection mirror to be incident to the optical module 121.

The hybrid integrated circuit chip 120 and the opto-electricity mixed device 300 according to the exemplary embodiment can be applied to various kinds of electronic apparatuses, such as a personal computer and the like, and can be used for information communication within apparatus and information communication to and from the external apparatuses and the like.

The present invention is not limited to the contents of each exemplary embodiment described above, and various modifications of the exemplary embodiments can be made within the scope of the spirit of the present invention. For example, according to the above-described exemplary embodiments, the guide pin is provided to the fiber supporting member and the guide hole is provided to the transparent substrate or the optical coupling member. However, the same action and effect can be attained, even if the guide pin is provided to the transparent substrate or the optical coupling member, and the guide hole is provided to the fiber supporting member.

The above-described manufacturing methods shown in FIGS. 2 and 3 is not limited to the mounting of the electro-optical elements according to the exemplary embodiments, but can be applied to methods, which form a hole precisely in a transparent substrate (for example, a glass substrate and a glass epoxy substrate), which are used for various applications.

According to the exemplary embodiments described above, by filling up the filler material into the guide hole, whose diameter is formed larger in advance, the formation position of the guide hole is adjusted while narrowing the diameter of the guide hole. However, the guide pin may be formed to either the transparent substrate or the fiber supporting member (optical transmission line support member) with precise positioning, and then the guide pin may be inserted into the guide hole, which is formed in advance to the other one of the transparent substrate and the fiber supporting member. Hereinafter, a manufacturing method in that case will be described in detail.

Figure 9A:
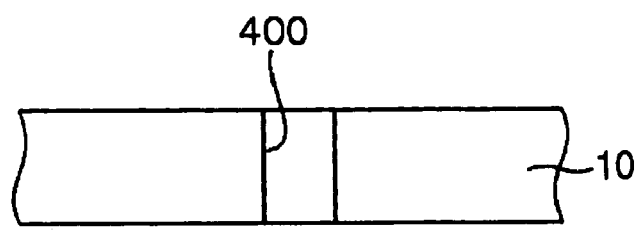
FIGS. 9(A)–9(D) are schematics explaining a manufacturing method in a case of forming a guide pin for one of a transparent substrate and a fiber supporting member with precise positioning.
Figure 9B:
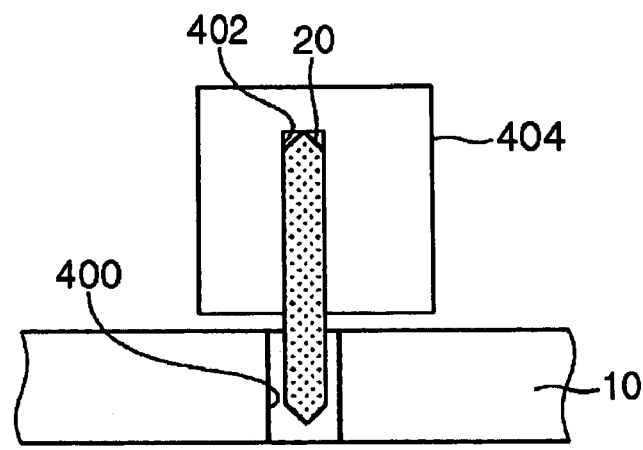
Figure 9C:
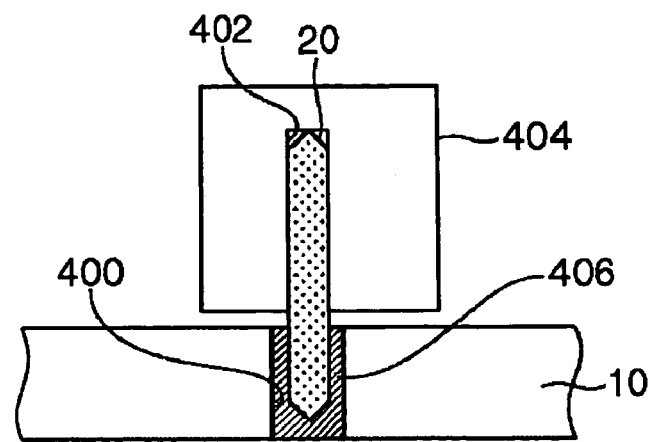
Figure 9D:
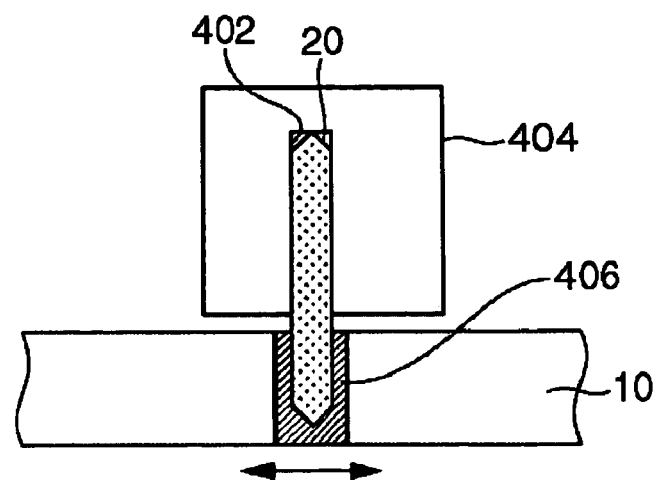
Figure 10A:
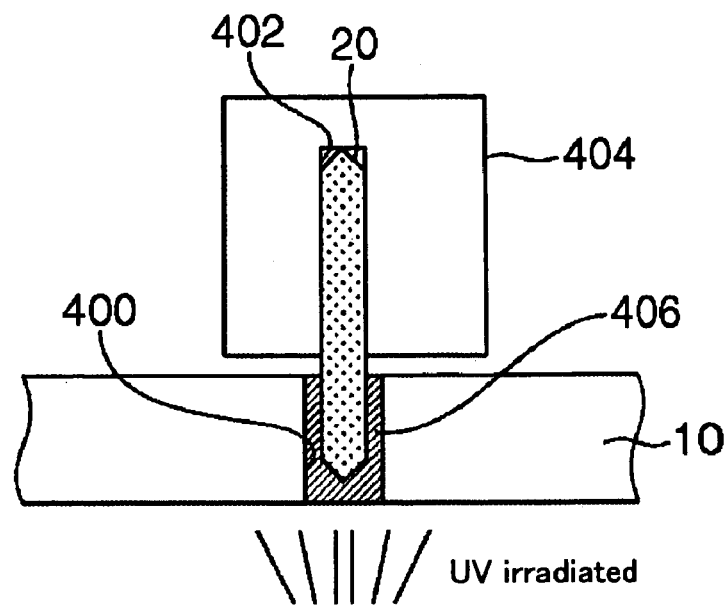
FIGS. 10(A)–10(C) are schematics explaining a manufacturing method in a case of forming a guide pin to one of the transparent substrate and a fiber supporting member with positioning precisely.
Figure 10B:
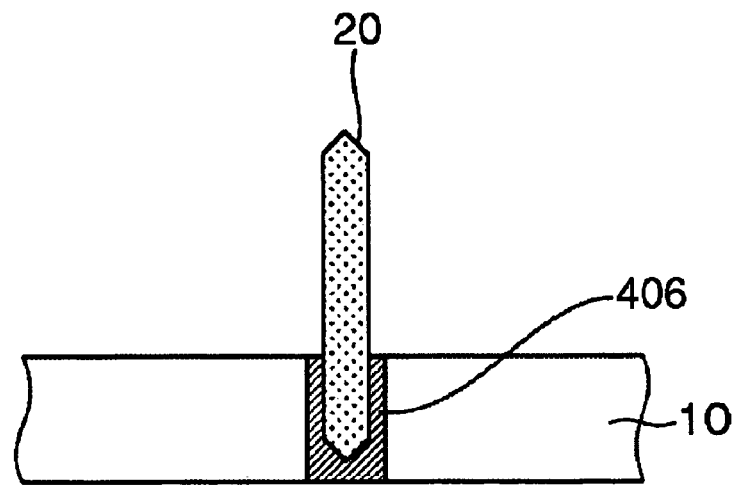
Figure 10C:
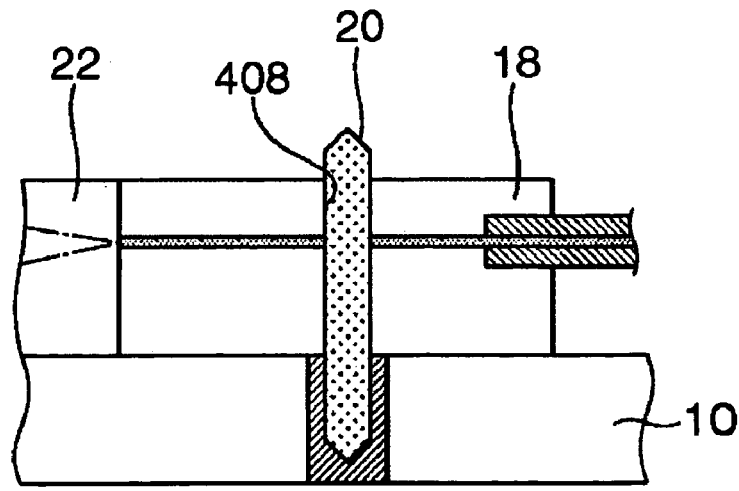

FIGS. 9 and 10 are views explaining a manufacturing method which forms a guide pin to either the transparent substrate or the fiber supporting member with precise positioning. First, a guide hole is formed in either the transparent substrate 10 or the fiber supporting member 18. For example, in the exemplary embodiment, the guide hole 408 is formed in the fiber supporting member 18 (refer to FIG. 10(C)). In this case, the hole diameter of the guide hole 408 is made substantially same as the diameter of the guide pin 20, which is to be inserted into the guide hole 408 afterward.

Next, as shown in FIG. 9(A), a fitting hole, into which the guide pin is to be fitted, is formed in the other one of the transparent substrate and the fiber supporting member, in which the guide pin is not formed, such that the diameter of the fitting hole is made larger as compared with the diameter of the guide pin. In the exemplary embodiment, the fitting hole 400 is formed in the transparent substrate 10.

Next, as shown in FIG. 9(B), a part of the guide pin 20 is inserted into the fitting hole 400. In the exemplary embodiment, the guide pin 20 is inserted into the fitting hole 400 by a jig 404 having a guide pin holding hole 402, whose diameter is substantially same as the diameter of the guide pin 20 such that, at least, a part the guide pin 20 is being inserted into the guide pin holding hole 402.

Next, as shown in FIG. 9(C), an adhesive 406 (filler material) is filled into the gap between the guide pin 20 and the fitting hole 400 by using a dispenser and the like. At this time, as for the adhesive 406, the adhesive, such as an optically-cured adhesive, which is cured by irradiating light, a thermosetting adhesive, which is cured by applying heat, and the like, which is cured by carrying out a certain predetermined processing afterward, are used. For example, according to the exemplary embodiment, an UV-cured adhesive, which is cured by irradiating ultraviolet rays (UV irradiation), is used.

Next, as shown in FIG. 9(D), the position of the guide pin 20 is adjusted within a range in which the guide pin 20 can move within the fitting hole 400. Next, as shown in FIG. 10(A), the adhesive 406 is cured by irradiating ultraviolet rays to the adhesive 406. Accordingly, while the bore of the fitting hole 400 is narrowed, the position of the guide pin 20 is determined at a preferred position with high precision.

Next, as shown in FIG. 10(B), upon the determination of the position, the jig 404 is taken away from the guide pin 20 that is fixed to the transparent substrate 10. Then, as shown in FIG. 10(C), the fiber supporting member 18 is mounted on the transparent substrate 10 so that the guide pin 20 is being inserted into the guide hole 408. Accordingly, an optical module having a configuration similar to that of the above-described optical module shown in FIG. 1 is attained.

After the guide pin is inserted into the fitting hole, the position of the guide pin is fine-adjusted according to the configuration and the like of the electro-optical element, and the filler material is cured after the fine adjustment. Therefore, the position of the guide pin can be determined precisely. Thus, by fitting the guide pin, whose position is determined in such a process, with the guide hole, the mutual positions of the transparent substrate and the optical transmission line support member can be adjusted with high precision. Therefore, enhancement of optical coupling efficiency can be attained by aligning and arranging precisely and easily the mutual positions of the optical transmission line and the electro-optical element. What is required for the size of the fitting hole is a size, which is sufficient to adjust a position of the guide pin, and thus there is another advantage that the formation becomes easy because the required precision for the formation position and the hole diameter decreases.

What is claimed is:

1. A method of manufacturing an optical module including a transparent substrate having an electro optical element on one surface side and an optical transmission line support member, which is arranged on the other surface side of the transparent substrate and supports one end of an optical transmission line, the method of manufacturing the optical module comprising the steps of:

forming a guide pin in either the transparent substrate or the optical transmission line support member;

forming a guide hole, in which the guide pin is to be inserted, in the other one of the transparent substrate and the optical transmission line support member, in which the guide pin is not formed, such that the diameter of the guide hole is made larger as compared with the diameter of the guide pin;

arranging a jig having a protruding portion, which diameter is substantially the same as the diameter of the guide pin such that the protruding portion is being inserted into the guide hole;

filling up a gap between the protruding portion and the guide hole with a filler material, which is cured by carrying out a predetermined processing;

adjusting a position of the jig within a range in which the protruding portion is movable inside the guide hole;

curing the filler material by carrying out a predetermined processing to the filler material, which is filled up in the gap between the protruding portion and the guide hole; and pulling out the protruding portion from the guide hole after having cured the filler material.

2. The manufacturing method of the optical module according to claim 1, further comprising the step of mounting the optical transmission line support member on the transparent substrate such that the guide pin is being inserted into the guide hole, in which the filler material is cured already.

3. A method of manufacturing an optical module including a transparent substrate having an electro optical element on one surface side and an optical transmission line support member, which is arranged on the other surface side of the transparent substrate and supports one end of an optical transmission line, the method of manufacturing the optical module comprising the steps of:

forming a guide hole in either the transparent substrate or the optical transmission line support member;

forming a fitting hole, into which the guide pin is to be fitted, in the other one of the transparent substrate and the optical transmission line support member, in which the guide hole is not formed, such that the diameter of the fitting hole is made larger as compared with the diameter of the guide pin;

inserting a part of the guide pin into the fitting hole;

filling up a gap between the guide pin and the fitting hole with a filler material, which is cured by carrying out a predetermined processing;

adjusting a position of the guide pin within a range in which the guide pin is movable inside the fitting hole; and curing the filler material by carrying out the predetermined processing to the filler material, which is filled up in the gap between the guide pin and the fitting hole.

4. The method of manufacturing the optical module according to claim 3, wherein the guide pin is inserted into the fitting hole such that, at least, a part of the guide pin is being inserted into a guide pin holding hole by a jig having the guide pin holding hole, which diameter is substantially the same as the diameter of the guide pin.

5. The method of manufacturing the optical module according to one of claim 3, further comprising the step of mounting the optical transmission line support member on the transparent substrate, such that the guide pin, which is fixed in the fitting hole by having cured the filler material, is being inserted into the guide hole.

6. A method of manufacturing an optical module including a transparent substrate having an electro optical element on one surface side and an optical transmission line support member, which is arranged on the other surface side of the transparent substrate and supports one end of an optical transmission line, the method of manufacturing the optical module comprising the steps of:
   forming a guide pin in either the transparent substrate or the optical transmission line support member;
   forming a guide hole, in which the guide pin is to be inserted, in the other one of the transparent substrate and the optical transmission line support member, in which the guide pin is not formed, such that the diameter of the guide hole is made larger to produce a gap between the guide pin and the guide hole when the guide pin is inserted into the guide hole;
   mounting the optical transmission line support member on the transparent substrate such that the guide pin is being inserted into the guide hole;
   filling up the gap between the guide pin and the guide hole with a filler material, which is cured by carrying out a predetermined processing;
   adjusting a position of the optical transmission line support member within a range in which the guide pin is movable inside the guide hole; and
   curing the filler material by carrying out the predetermined processing to the filler material, which is filled up in the gap between the guide pin and the guide hole.

7. A method of manufacturing an optical module including a transparent substrate having an electro optical element on one surface side, an optical transmission line support member, which is arranged on the other surface side of the transparent substrate and supports one end of an optical transmission line, and an optical coupling member, which is arranged on the other side surface of the transparent substrate and has a role of optical coupling the electro optical element with the optical transmission line, wherein the method of manufacturing the optical module comprising the steps of:
   forming a guide pin in either the optical transmission line support member or the optical coupling member;
   forming a guide hole, in which the guide pin is to be inserted, in the other one of the optical transmission line support member and the optical coupling member, in which the guide pin is not formed, such that the diameter of the guide hole is made larger to produce a gap between the guide pin and the guide hole when the guide pin is inserted into the guide hole;
   mounting the optical transmission line support member on the transparent substrate such that the guide pin is being inserted into the guide hole;
   filling up the gap between the guide pin and the guide hole with a filler material, which is cured by carrying out a predetermined processing;
   adjusting a position of the optical transmission line support member within a range in which the guide pin is movable inside the guide hole; and
   curing the filler material by carrying out the predetermined processing to the filler material, which is filled up in the gap between the guide pin and the guide hole.

8. The method of manufacturing the optical module according to one of claim 6, further comprising the step of pulling out the guide pin from the guide hole after having cured the filler material.

9. The method of manufacturing the optical module according to claim 1, wherein the filler material includes either a thermosetting adhesive or an optically-cured adhesive.

10. An optical module, comprising:
   a transparent substrate, which has optical permeability to the wavelength of the light used;
   an electro optical element, which is arranged on one surface side of the transparent substrate and radiates signal light toward the other surface side of the transparent substrate according to provided electrical signal, or which generates electrical signal according to the luminous intensity of signal light provided from the other surface side of the transparent substrate;
   an optical transmission line support member, which is arranged on the other surface side of the transparent substrate and supports one end of an optical transmission line; and
   an optical coupling member, which is arranged on the other surface side of the transparent substrate and performs optical coupling between the electro optical element and the optical transmission line, wherein either the transparent substrate or the optical transmission line support member has a guide pin, while the other one has a guide hole, in which the guide pin is to be inserted, and the diameter of the guide hole is made larger as compared with the diameter of the guide pin so that a gap is produced between the guide pin and the guide hole, and the gap between the guide pin and the guide hole is filled up with a predetermined filler material.

11. The optical module according to claim 10, wherein the optical transmission line support member supports the optical transmission line such that the extension direction of the optical transmission line becomes substantially parallel to the other surface side of the transparent substrate, and the optical coupling member has a reflective portion, which changes the course of signal light radiated from the electro optical element by substantially 90 degrees to be guided to the optical transmission line, or which changes the course of signal light radiated from the optical transmission line by substantially 90 degrees to be guided to the electro optical element, and the guide pin is arranged to be substantially orthogonal to the other surface side of the transparent substrate.

12. An optical module, comprising:
   a transparent substrate which has optical permeability to the wavelength of the light used;
   an electro optical element, which is arranged on one surface side of the transparent substrate and radiates signal light toward the other surface side of the transparent substrate according to provided electrical signal, or which generates electrical signal according to the luminous intensity of signal light provided from the other surface side of the transparent substrate;
   an optical transmission line support member, which is arranged on the other surface side of the transparent substrate and supports one end of an optical transmission line; and an optical coupling member, which is arranged on the other surface side of the transparent substrate and performs optical coupling between the electro optical element and the optical transmission line, wherein either the optical transmission line support member or the optical coupling member has a guide pin and the other one has a guide hole, in which the guide pin is to be inserted, and the diameter of the guide hole is made larger as compared with the diameter of the guide pin so that a gap is produced between the guide pin and the guide hole, and the gap between the guide pin and the guide hole is filled up with a predetermined filler material.

13. The optical module according to claim 12, wherein the optical transmission line support member supports the optical transmission line such that the extension direction of the optical transmission line becomes substantially parallel to the other surface side of the transparent substrate, and the optical coupling member has a reflective portion, which changes the course of signal light radiated from the electro optical element by substantially 90 degrees to be guided to the optical transmission line, or which changes the course of signal light radiated from the optical transmission line by substantially 90 degrees to be guided to the electro optical element, and the guide pin is arranged to become substantially parallel to the extension direction of the optical transmission line.

14. The optical module according to claim 11, wherein the optical coupling member further has a lens, which converges signal light radiated from the electro optical element to be guided to the reflective portion, or which converges signal light radiated from the optical transmission line and then reflected by the reflective portion to be guided to the electro optical element.

15. The optical module according to claim 11, wherein the optical coupling member further has a first lens, which turns signal light radiated from the electro optical element into a parallel light to be guided to the reflective portion or which converges signal light radiated from the optical transmission line and then reflected by the reflective portion to be guided to the electro optical element, and a second lens which converges signal light radiated from the electro optical element and then reflected by the reflective portion to be guided to the optical transmission line, or which turns signal light radiated from the optical transmission line into a parallel light to be guided to the reflective portion.

16. The optical module according to claim 11, wherein the optical coupling member further has a first lens, which turns signal light radiated from the electro optical element into a parallel light to be guided to the reflective portion, or which converges signal light radiated from the optical transmission line and then reflected by the reflective portion to be guided to the electro optical element, and the optical transmission line support member further has a second lens which converges signal light radiated from the electro optical element and then reflected by the reflective portion to be guided to the optical transmission line, or which turns signal light radiated from the optical transmission line into a parallel light to be guided to the reflective portion.

17. The optical module according to claim 11, wherein the reflective portion has either a metal film or a dielectric multi-layered film.

18. A hybrid integrated circuit, comprising the optical module according to claim 10.

19. A hybrid circuit board, comprising the optical module according to claim 10.

20. An electronic apparatus, comprising the optical module according to claim 10.

21. A method of manufacturing an opto-electricity mixed device, including:
a circuit board, having a conductive film transmitting electrical signal and an optical transmission line having a roll of transmitting signal light; and
a hybrid integrated circuit chip, which is coupled to the circuit board and has a role of conversion between the electrical signal and the signal light, wherein the method of manufacturing the opto-electricity mixed device comprising the steps of:
forming a guide pin in either the hybrid integrated circuit chip or the circuit board;
forming a guide hole in the other one of the hybrid integrated circuit chip and the circuit board, in which the guide pin is to be inserted, such that the diameter of the guide hole is made larger as compared with the diameter of the guide pin;
arranging a jig having a protruding portion on top of the circuit board, which diameter is substantially the same as the diameter of the guide pin, such that the protruding portion is being inserted into the guide hole;
filling up the gap between the protruding portion and the guide hole with a filler material, which is cured by carrying out a predetermined processing;
adjusting a position of the jig within a range in which the protruding portion is movable inside the guide hole;
curing the filler material by carrying out the predetermined processing to the filler material, which is filled up in the gap between the protruding portion and the guide hole; and
pulling out the protruding portion from the guide hole after having cured the filler material.

22. A method of manufacturing an opto-electricity mixed device, including a circuit board having a conductive film transmitting electrical signal and an optical transmission line transmitting signal light, and a hybrid integrated circuit chip, which is coupled to the circuit board and converts the electrical signal into signal light, vice versa, the method of manufacturing the opto-electricity mixed device comprising the steps of:
forming a guide pin in either the hybrid integrated circuit chip or the circuit board;
forming a guide hole, in which the guide pin is to be inserted, in the other one of the hybrid integrated circuit chip and the circuit board, and which diameter is made larger so that a gap is produced between the guide pin and the guide hole when the guide pin is inserted into the guide hole;
mounting the hybrid integrated circuit chip on top of the circuit board such that the guide pin is being inserted into the guide hole;
filling up the gap between the guide pin and the guide hole with a filler material, which is cured by carrying out a predetermined processing;
adjusting a position of the hybrid integrated circuit chip within a range in which the guide pin is movable inside the guide hole; and
curing the filler material by carrying out the predetermined processing to the filler material, which is filled up in the gap between the guide pin and the guide hole.

23. The manufacturing method of the opto-electricity mixed device according to one of claim 21, wherein the hybrid integrated circuit chip comprises a transparent substrate having optical permeability to the wavelength of the light used, and an electro optical element which is arranged on one surface side of the transparent substrate and radiates signal light toward the other surface side of the transparent substrate according to provided electrical signal, or which generates electrical signal according to the luminous intensity of signal light provided from the other surface side of the transparent substrate, and either the guide pin or the guide hole is formed on the transparent substrate.

24. An opto-electricity mixed device, comprising:
a circuit board having a conductive film transmitting electrical signal and an optical transmission line transmitting signal light; and
a hybrid integrated circuit chip, which is coupled to the circuit board and converts the electrical signal into the signal light, or vice versa, wherein either the circuit board or the hybrid integrated circuit chip has a guide pin, and the other one has a guide hole, in which the guide pin is to be inserted and which diameter is made larger as compared with the diameter of the guide pin so that a gap is produced between the guide pin and the guide hole, and the gap between the guide pin and the guide hole is filled up with a predetermined filler material.

25. The opto-electricity mixed device according to claim 24, wherein the hybrid integrated circuit chip comprises:
a transparent substrate, which has optical permeability to the wavelength of the light used, and
an electro optical element, which is arranged on one surface side of the transparent substrate and radiates signal light toward the other surface side of the transparent substrate according to provided electrical signal, or which generates electrical signal according to the luminous intensity of signal light provided from the other surface side of the transparent substrate, wherein the guide pin or the guide hole is formed on the transparent substrate.

* * * * *